United States Patent [19]
Johnson et al.

[11] 3,737,015
[45] June 5, 1973

[54] SPRING MOUNTING ARRANGEMENT FOR ONE-WAY ROLLER CLUTCH

[75] Inventors: Lawrence P. Johnson, Huron; Oscar G. Kitchin, Port Clinton, both of Ohio

[73] Assignee: General Motors Corporation, Detroit, Mich.

[22] Filed: May 24, 1972

[21] Appl. No.: 256,345

[52] U.S. Cl. .................................................. 192/45
[51] Int. Cl. ............................................. F16d 41/06
[58] Field of Search ...................... 192/45; 188/82.84

[56] References Cited
UNITED STATES PATENTS

| | | | |
|---|---|---|---|
| 3,118,525 | 1/1964 | Fisher | 192/45 |
| 3,194,368 | 7/1965 | Benson et al. | 192/45 |
| 3,249,186 | 5/1966 | Kluwe | 192/45 |
| 3,528,534 | 9/1970 | Benson et al. | 188/82.84 X |

*Primary Examiner*—Allan D. Herrmann
*Attorney*—J. L. Carpenter and F. J. Fodale

[57] ABSTRACT

An improved arrangement for mounting a roller engaging spring on the outer clutch member of a one-way roller clutch comprises a pair of spring mounting lugs protruding from flanges on the outer clutch member and a channel as an integral part of the spring. The channel is snapped onto the lugs in a generally radial direction past resilient detent tabs located at the open end of the channel. The tabs retain the lugs against the bottom of the channel securing the spring to the outer clutch in the radial direction. Securement in the circumferential direction is provided by the flanking engagement of the channel with the lugs. A hook portion may be included on the spring for engagement with the outer clutch member to take up tolerance between the channel and the lugs.

4 Claims, 5 Drawing Figures

Patented June 5, 1973  3,737,015

3,737,015

SPRING MOUNTING ARRANGEMENT FOR ONE-WAY ROLLER CLUTCH

Our invention relates generally to one-way roller clutches and more specifically to an improved arrangement for mounting a roller engaging spring directly on one of the roller clutch members.

One-way roller clutches having one or more springs mounted on a clutch member to individually engage one or more rollers and lightly bias them into incipient wedging engagement between the clutch members so that the clutch immediately engages in response to relative rotation of the clutch members in one direction are well known.

Recently, metal die forming techniques have progressed to the point where the possibility exists to fabricate an outer clutch member by drawing a cup with circumferentially spaced cams on its internal surface and folding over the open end of the cup to provide a relatively inexpensive unitary sheet metal outer clutch member with integral end flanges.

Broadly, the object of our invention is to provide an improved arrangement for mounting a roller engaging spring on such a sheet metal outer clutch member for use in any one-way roller clutch in which at least one roller is lightly biased into incipient wedging engagement by a spring.

Another object of our invention is to provide an improved arrangement for mounting a spring on such a clutch member wherein the spring is mounted on the end flanges of the clutch member by a simple insertion of the spring into the space between the end flanges.

Another object of our invention is to provide an improved arrangement for mounting a spring on such a clutch member wherein all structure necessary to mount the spring forms an integral part of either the spring or the clutch member.

Another object of our invention is to provide an improved arrangement for mounting a spring on such a clutch member in which the spring is snap retained on structure integral with the clutch member.

Yet another object of our invention is to provide an improved arrangement for securely mounting a spring on such a clutch member which takes up tolerances between the cooperating parts of the spring and the clutch member.

Still another object of our invention is to provide an improved arrangement for mounting a spring on such a clutch member in which the spring is directly secured to simple offset portions on the end flanges on the clutch member.

Other objects and features of the invention will become apparent to those skilled in the art as the disclosure is made in the following detailed description of a preferred embodiment of the invention as illustrated in the accompanying sheet of drawings in which.

Figure 1:
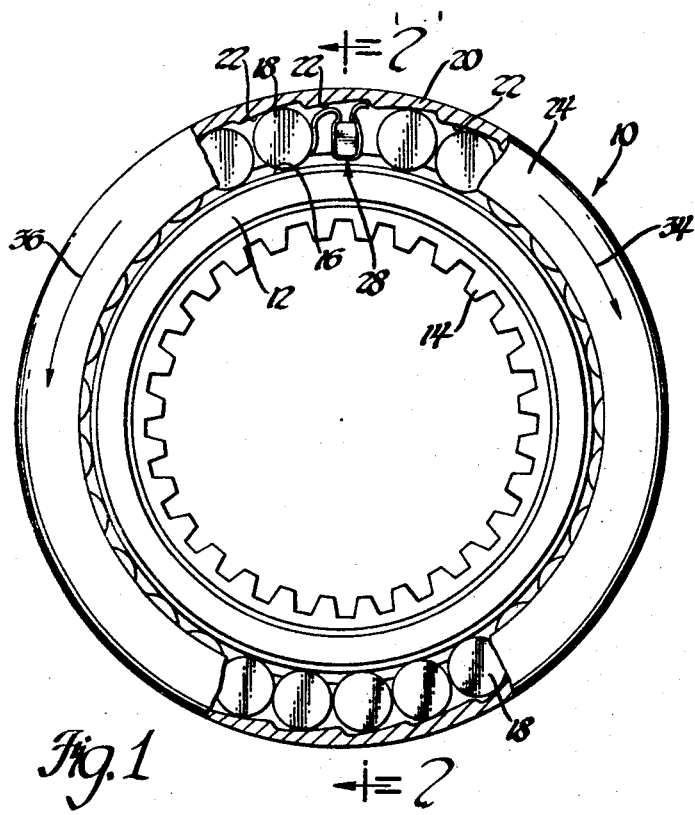
FIG. 1 is an elevation view, partially sectioned, of a one-way roller clutch having an improved arrangement for mounting a roller engaging spring on the outer clutch member in accordance with our invention.
Figure 2:
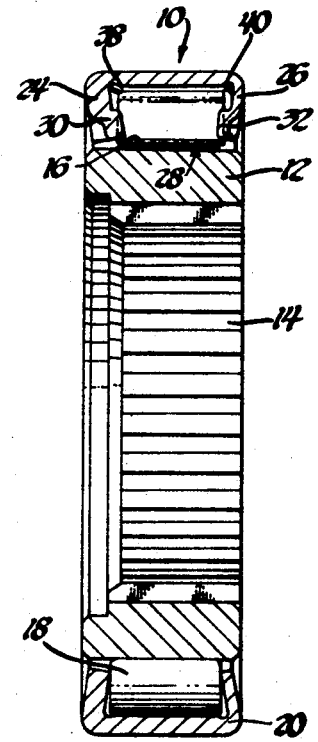
FIG. 2 is a section taken substantially along the line 2—2 of FIG. 1.

Referring now to FIGS. 1 and 2 of the drawings a one-way roller clutch 10 comprises an inner clutch member 12 having internal splines 14 for securing the inner clutch member to a shaft or the like. The outer surface of the inner clutch member 12 provides a cylindrical race 16 contacted by a plurality of rollers 18. Surrounding the rollers 18 is the outer clutch member 20 which includes inwardly sloped cams 22 and integral end flanges 24 and 26. A generally S-shaped spring 28 secured to a pair of aligned lugs 30 and 32 on the end flanges 24 and 26 respectively engages the roller 18 immediately to the left of the spring 28 as viewed in FIG. 1. The spring 28 lightly biases this roller circumferentially in a counterclockwise direction with respect to the outer clutch member 20 into the narrow end of the wedge shaped space between the cam 22 and the cylindrical race 16.

The particular clutch which is illustrated is substantially of the full complement type with the annular space between the inner and outer clutch members almost completely filled with rollers except for the space occupied by the spring 28. There is substantially no clearance between adjacent rollers.

In operation, the outer clutch member 20 locks up with the inner clutch member 12 in response to relative rotation of the outer clutch member 20 in the clockwise direction as indicated by the arrow 34. The outer clutch member 20 freewheels or overruns in the counterclockwise direction relative to the inner clutch member 12 as indicated by the arrow 36.

While the theoretical operation of the full complement type clutch illustrated is not precisely known, it is believed that deflections at the surfaces of the clutch members engaged by the rollers and in the rollers themselves produces a domino effect. Briefly in the lock-up mode of operation, the roller 18 biased by the spring 28 is immediately wedged between the clutch members which in turn causes the adjacent roller to wedge between the clutch members which in turn causes the next adjacent roller to wedge between the clutch members and so on until each of the remaining rollers is in turn successively wedged between the clutch members. The freewheel or overrun mode of operation is similar, that is, the friction between the roller 18 immediately to the left of the spring 28 and the freewheeling clutch member produces a small force which is sufficient to overcome the bias of the spring 28 and move the roller out of a wedging engagement between its cam 22 and the cylindrical race 16. This in turn allows the remainder of the rollers to in turn successively move to a non-wedging position under the influence of the frictional force produced by the freewheeling clutch member. While the improved spring mounting arrangement is illustrated in conjunction with a one-way roller clutch of the full complement type it is to be understood that our invention is applicable to other types of clutches where more than a single roller is biased by a spring into light incipient wedging engagement with the clutch members. For example, our invention would be applicable to one-way roller clutches where 2, 3, 4 or any number of rollers up to the entire number of rollers in the clutch were individually spring biased.

The outer clutch member 20 is conveniently fabricated from sheet metal by drawing a cup with internal circumferentially spaced cams such as the cams 22 illustrated in FIGS. 1 and 2 with drawing techniques that provide a relief 38 at the corner of the cup. The bottom of the cup is pierced out to provide the end flange 24. A thinned lip at the open end of the cup is folded over to provide the end flange 26 using die forming techniques which form a relief 40 at the corner of the flange 26.

Our improved spring mounting arrangement is especially adaptable to such a sheet metal outer clutch member wherein lugs 30 and 32 can be integrated into the end flanges 24 and 26 respectively by offsetting a portion of each of the flanges during their formation. The improved spring mounting arrangement of our invention utilizes the lugs 30 and 32 formed on the end flanges 24 and 26 respectively which are shown more clearly in the enlarged views of FIGS. 3 and 4.

Figure 5:
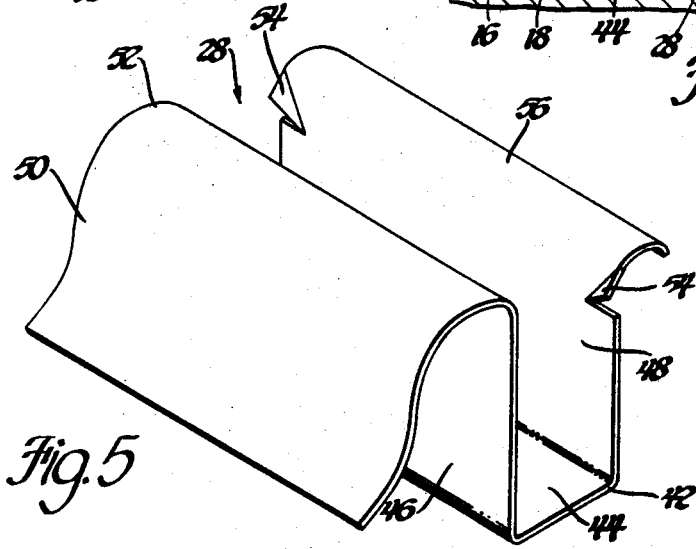
FIG. 5 is a perspective view of the roller engaging spring shown in FIGS. 1, 2, 3 and 4.

Referring now to FIG. 5, the spring 28 which is formed from a flat strip has a generally S-shaped configuration which includes a generally U-shaped channel 42 having a flat bottom wall 44 and substantially parallel legs 46 and 48. A roller engaging leaf spring portion 50 is connected to the upper free end of the leg 46 by an interposed bight portion 52. The upper end of leg 48 has a resilient tab 54 at each side thereof. Each of the tabs 54 are provided by bending out a triangular portion of the leg along a diagonal line extending from a short lateral pierce to the edge of the leg. The upper free end of the leg 48 continues into a cam hook 56.

Figure 3:
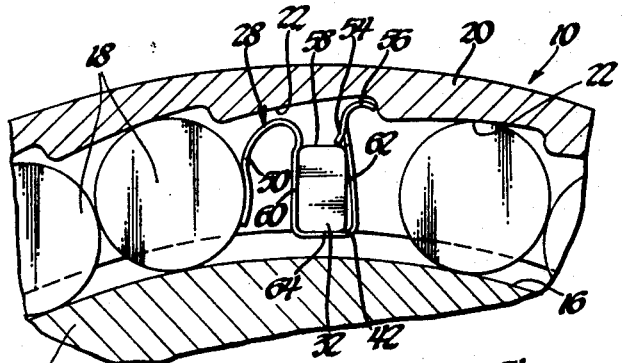
FIG. 3 is an enlarged view of a portion of FIG. 1.
Figure 4:
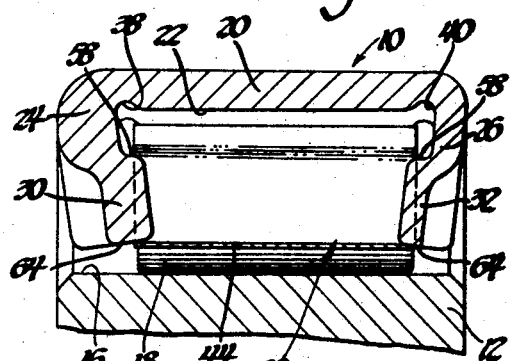
FIG. 4 is an enlarged view of a portion of FIG. 2.

Referring now to FIGS. 3 and 4, the spring 28 is mounted on the lugs 30 and 32 projecting inwardly from the confronting faces of the flanges 24 and 26. Each lug has a generally rectangular configuration and is disposed so that its outer generally circumferential surface 58 is radially spaced from the internal surface of the outer clutch member 20 defining the cams 22. The generally radial surfaces 60 and 62 formed by the offset lug 30 are substantially flat and parallel. The lugs 30 and 32 nest in the lateral end portions of the channel 42 in spring 28. The bottom wall 44 of the channel 42 is held against the inner surfaces 64 of the lugs 30 and 32 by the resilient tab 54 locating the spring 28 radially on the outer clutch member 20. The legs 46 and 48 of the channel 42 flank the lugs 30 and 32 in the circumferential direction engaging lug surfaces 60 and 62 respectively to locate the spring 28 circumferentially on the outer clutch member 20. The lugs 30 and 32 disposed in the channel 42 having a rectangular configuration constrain the spring 28 against rotational movement about the lugs. The cam hook 56 which may be provided engages the internal surface of the outer clutch member 20 and biases the leg 48 into engagement with the lugs 30 and 32 to take up any variation between the width of the lugs 30 and 32 and the width between the legs 46 and 48 on the spring 28 due to manufacturing tolerances.

The spring 28 is assembled to the outer clutch member 20 by a simple radial insertion of the spring 28 into the space between the flanges 24 and 26 from the inside of the outer clutch member 20. When so inserted the tabs 54 are resiliently depressed back into the plane of the leg 48 allowing the end portions of the channel 42 to slip onto the lugs 30 and 32. When the bottom wall 44 of the channel 42 abuts the inner surfaces 64 on the lugs 30 and 32, the resilient tabs 54 snap out into engagement with the outer circumferential surfaces 58 on the lugs 30 and 32 holding the spring in place radially as shown in FIG. 3. The spring is held circumferentially by the flanking engagement of the legs 46 and 48 with the lug 30 as previously described.

We wish it to be understood that we do not desire to be limited to the exact details of construction shown and described, for obvious modifications will occur to a person skilled in the art.

We claim:

1. In a one-way roller clutch having an inner clutch member with a cylindrical race, a unitary sheet metal outer clutch member with a plurality of circumferentially spaced, inwardly sloped cams on an interior surface thereof forming wedge shaped spaces with said cylindrical race and inturned end flanges having spaced confronting faces, a plurality of rollers disposed between said inturned flanges in said wedge shaped spaces, and at least one spring mounted on said outer clutch member and engaging one of said rollers to bias said one roller circumferentially into wedging engagement between one of said cams and said cylindrical surface, an improved spring mounting arrangement comprising, at least one pair of aligned lugs on said inturned flanges protruding from said confronting faces thereof, each of said lugs being spaced radially from said interior surface on said outer clutch member, and said spring having substantially U-shaped portions receiving said lugs respectively in a substantially non-rotative and flanking engagement and resilient detent means on said substantially U-shaped portions adjacent the open end thereof engaging said lugs and retaining said lugs in said U-shaped portions whereby said spring is mounted on said outer clutch member.

2. In a one-way roller clutch having an inner clutch member with a cylindrical race, a unitary she metal outer clutch member with a plurality of circumferentially spaced, inwardly sloped cams on an interior surface thereof forming wedge shaped spaces with said cylindrical race and inturned end flanges having spaced confronting faces, a plurality of rollers disposed between said inturned flanges in said wedge shaped spaces, and at least one spring mounted on said outer clutch member and engaging one of said rollers to bias said one roller circumferentially into wedging engagement between one of said cams and said cylindrical surface, an improved spring mounting arrangement comprising, at least one pair of aligned lugs on said inturned flanges protruding from said confronting faces thereof, each of said lugs being spaced radially from said interior surface on said outer clutch member, and said spring having substantially U-shaped portions having a bottom wall and a pair of legs, said U-shaped portions receiving said lugs respectively in a substantially non-rotative engagement with said pair of legs flanking said lugs, said substantially U-shaped portions having resilient detent means on one of said pair of legs engaging said lugs and retaining said lugs in said U-shaped portions against said bottom wall whereby said spring is mounted on said outer clutch member.

3. In a one-way roller clutch having an inner clutch member with a cylindrical race, a unitary sheet metal outer clutch member with a plurality of circumferentially spaced, inwardly sloped cams on an interior surface thereof forming wedge shaped spaces with said cylindrical race and inturned end flanges having spaced confronting faces, a plurality of rollers disposed between said inturned flanges in said wedge shaped spaces, and at least one spring mounted on said outer clutch member and engaging one of said rollers to bias said one roller circumferentially into wedging engagement between one of said cams and said cylindrical surface, an improved spring mounting arrangement comprising, at least one pair of aligned lugs on said inturned flanges protruding from the confronting faces thereof, said lugs having flats and generally circumferential surfaces spaced from the interior surface of said outer member, and said spring comprising a flat strip formed into a generally S-shaped configuration having a channel with a flat wall and resilient detent portions adjacent the open end thereof, said channel flanking said lugs with said flat wall engaging said flats and said resilient detent portions engaging said generally circumferential surfaces on said lugs to retain said lugs within said channel whereby said spring is mounted on said outer clutch member.

4. In a one-way roller clutch having an inner clutch member with a cylindrical race, a unitary sheet metal outer clutch member with a plurality of circumferentially spaced, inwardly sloped cams on an interior surface thereof forming wedge shaped spaces with said cylindrical race and inturned end flanges having spaced confronting faces, a plurality of rollers disposed between said inturned flanges in said wedge shaped spaces, and at least one spring mounted on said outer clutch member and engaging one of said rollers to bias said one roller circumferentially into wedging engagement between one of said cams and said cylindrical surface, an improved spring mounting arrangement comprising, at least one pair of aligned offset portions in said flanges providing lugs protruding from said confronting faces thereof, said lugs having substantially rectangular contours with outer generally circumferential surfaces spaced from said interior surface on said outer race member, and said spring comprising a flat strip formed to include a channel with substantially parallel legs, a leaf spring portion connected to the free end of one of said legs by an interposed bight portion, resilient tabs on the other of said legs adjacent the free end thereof and a hook portion connected to said other leg at said free end thereof, said lugs being disposed in said channel, said hook portions engaging said interior surface on said outer clutch member and biasing said legs into flanking engagement with said lugs, and said resilient tabs engaging said outer generally axial surfaces on said lugs to retain said lugs in said channel against the bottom thereof whereby said spring is securely mounted on said outer clutch member.

\* \* \* \* \*